United States Patent [19]
Watanabe et al.

[11] Patent Number: 5,036,028
[45] Date of Patent: Jul. 30, 1991

[54] HIGH DENSITY METAL BORIDE-BASED CERAMIC SINTERED BODY

[75] Inventors: Tadahiko Watanabe; Tsuyoshi Doutsu; Kazuhisa Shobu, all of Tosu; Yukio Kai, Fukuoka, all of Japan

[73] Assignee: Agency of Industrial Science and Technology, Tokyo, Japan

[21] Appl. No.: 511,816

[22] Filed: Apr. 18, 1990

Related U.S. Application Data

[63] Continuation of Ser. No. 189,556, May 3, 1988, abandoned.

[51] Int. Cl.$^5$ .............................. C04B 35/58
[52] U.S. Cl. ........................ 501/96; 501/87; 501/93; 75/236; 75/238; 75/244
[58] Field of Search ............ 501/87, 93, 96; 75/236, 75/238, 244

[56] References Cited

U.S. PATENT DOCUMENTS

| | | | |
|---|---|---|---|
| 4,259,119 | 3/1981 | Watanabe et al. | 501/96 |
| 4,275,026 | 6/1981 | Hazel et al. | 501/96 |
| 4,492,764 | 1/1985 | Watanabe et al. | 501/96 |

FOREIGN PATENT DOCUMENTS

| | | | |
|---|---|---|---|
| 55-047227 | 4/1980 | Japan . | |
| 55-128560 | 10/1980 | Japan . | |
| 55-167180 | 12/1980 | Japan . | |
| 56-078480 | 6/1981 | Japan . | |
| 57-042579 | 3/1982 | Japan . | |
| 60-013048 | 1/1985 | Japan | 75/238 |
| 60-103080 | 6/1985 | Japan . | |
| 60-155571 | 8/1985 | Japan | 501/87 |
| 61-097169 | 5/1986 | Japan . | |

Primary Examiner—Mark L. Bell
Assistant Examiner—Anthony J. Green
Attorney, Agent, or Firm—Jordan and Hamburg

[57] ABSTRACT

A high density metal-boride based ceramic sintered body consists essentially of component (A) at least one of $TiB_2$, $ZrB_2$, $CrB_2$, $HfB_2$, $VB_2$, $TaB_2$, $NbB_2$, $MnB_2$, $MoB_2$, $YB_2$, $AlB_2$, $MgB_2$, CrB, VB, TaB, NbB, MoB, HfB, YB, ZrB, HfB, TiB, MnB, $W_2B_5$ and $Mo_2B_5$, componet (B) 0.1 wt. %–10 wt. % based on the total amount of a metal binder comprising at least one of cobalt boride, nickel boride and iron boride, and component (C) 0.1 wt. %–10 wt. % based on the total amount of at least one of a double carbide comprising Ti, Zr, W and C, ZrCN, HfCN, or a double carbo-nitride comprising Ti, Zr, Hf and C, N.

The sintered body is not easily oxidized and has extremely few pores and high shock resistance even using a fine grain raw material powder because component (C) has an oxygen removing effect during sintering.

8 Claims, No Drawings

HIGH DENSITY METAL BORIDE-BASED CERAMIC SINTERED BODY

This application is a continuation of application Ser. No. 189,556, filed May 3, 1988, now abandoned.

BACKGROUND OF THE INVENTION

The present invention relates to a novel metal-boride based ceramic sintered body having a high density which is suitable as a material for a cutting tool for woodwork and as wear-resistant materials.

Tungsten carbide has been mainly used as material for cutting tools, but there has been a short supply of such raw material recently. Metal borides such as diborides of titanium have mainly been used instead of tungsten carbide.

The metal boride sintered body has high heat resistance, oxidation resistance and strength and hardness at high temperatures, and can be easily obtained from natural resources, but is difficult to sinter and possesses low bending strength as a cutting tool.

The present inventors have already proposed bonding agents for the purpose of improving the sinterability and the bending strength of metal boride sintered bodies (Japanese Publication of Examined Patent Application SHO SHO56-41690, Japanese Publication of Examined Patent Application SHO56-45984, Japanese Publication of Unexamined Patent Application SHO54-72779, Japanese Publication of Unexamined Patent Application SHO56-23246 and Japanese Publication of Unexamined Patent Application SHO56-32379), and certain advantageous effects resulted from the use of these bonding agents. Therefore, the present inventors have further developed materials for improving the heat resistance, the hardness and the bending strength and have developed a material wherein at least one of a metal monoboride and diboride such as Ti, Cr, V, Ta, Nb, Mn, Mo, Hf, Al and Zr as the basic component, and at least one metal component selected from a metal carbide and metal nitride, is combined with the basic component and then sintered (Japanese Publication of Unexamined Patent Application SHO57-42578).

The material has satisfactory properties as a wear-resistant tool, but also has unsatisfactory toughness as a cutting tool for woodwork. Therefore, a ceramic-added carbo-titanium nitride was developed (Japanese Publication of Unexamined Patent Application SHO61-97169). However, it is further necessary to improve the shock resistance of such materials to enable their wide use as cutting tools.

SUMMARY OF THE INVENTION

It is an object of the present invention to provide a shock-resistant metal-boride based ceramic sintered body which can be widely used in cutting tools or wear-resistant tools.

The present inventors have zealously worked at enhancing the shock resistance of a metal-boride ceramic, and have discovered that it is necessary to raise the toughness and to remove large grains or pores which otherwise constitute defects in order to improve the wear resistance. Therefore, fine-grained boride metal powder raw material was produced and used to obtain a sintered body. However, fine-grained boride metal powder is easily oxidized, pores increase and the shock resistance is not significantly improved. Therefore, an addition agent having an oxide removing effect was discovered, but it was also proved that a carbide and carbo-nitride have the same oxide removing effect and that a double carbide and double carbo-nitride have further remarkable oxide removing effects. It has also been confirmed that the shock resistance is improved by oxide removing. The present inventors thus were led to the present invention.

The object of the present invention is attained by a high density metal-boride based ceramic sintered body consisting essentially of component (A) at least one of $TiB_2$, $ZrB_2$, $CrB_2$, $HfB_2$, $VB_2$, $TaB_2$, $NbB_2$, $MnB_2$, $MoB_2$, $YB_2$, $AlB_2$, $MgB_2$, CrB, VB, TaB, NbB, MoB, HfB, YB, ZrB, HfB, TiB, MnB, $W_2B_5$ and $Mo_2B_5$, component (B) at least one of cobalt boride, nickel boride and iron boride as a metal compound bonding agent and component (C) 0.1 wt.% –10 wt. % based on the total amount of at least one of a double carbide comprising Ti, Zr, W and C, ZrCN, HfCN, or a double carbo-nitride comprising Ti, Zr, Hf and C,N.

DETAILED DESCRIPTION OF THE PREFERRED EMBODIMENTS

The main components of the present invention are as follows:

Component (A) is a metal-boride selected from metal diborides such as $TiB_2$, $ZrB_2$, $CrB_2$, $VB_2$, $TaB_2$, $NbB_2$, $MnB_2$, $MoB_2$, $HfB_2$, $YB_2$, $AlB_2$, MgB and ZrB, metal monoborides such as CrB, VB, ZrB, TaB, NbB, MoB, HfB, YB, AlB and MgB, and metal dimetal pentaborides such as $W_2B_5$ and $Mo_2B_5$. These metal-borides are used individually or in combinations of more than two.

Metal components as a binder used as component (B) are those usually used as a binder for metal-boride based sintered bodies, for example, cobalt borides such as CoB, $Co_2B$, $Co_2B$, nickel borides such as NiB, $Ni_2B$, $Ni_3B$ and $Ni_4B_3$ and iron borides such as FeB and $Fe_2B$. These metal components are used individually or in combinations of more than two.

The addition amount of metal components as a binder is selected in the range of 0.1-10 wt. % based on the total amount of raw material composition. Minutalizing is shown with an addition amount of less than 0.1 wt. %, and perspiration on the ceramic surface occurs during sintering with an addition amount of more than 10 wt. %, so that there is no reason to add metal components in amounts beyond the selected range.

It is necessary to add one or more than two of a double carbide, carbo-nitride and double carbo-nitride to the basic component consisting of the above-mentioned components (A) and (B) in the present invention.

The double carbide consists of Ti, Zr, Hf or W and C, and the atomic ratio of these two metals is in the range of 1:9–9:1.

The double carbo-nitride consists of Ti, Zr, or Hf and C,N. The atomic ratio of the two metals is in the range of 1:9–9:1, and the atomic ratio C/N of carbon and nitrogen is 1/9–9.

The double carbo-nitride having less than a 1/9 atomic ratio of C/N acts the same as a double nitride. The double carbonitride having more than a 9 atomic ratio of C/N acts the same as a double carbide, and the addition effect also becomes the same as a double carbide. Furthermore, a range of 1/9–9 in two metals of metal atomic ratio M/M is the most desirable.

Carbo-nitride comprises Zr and Hf, and the range of 1/9–9 for the atomic ratio C/N of carbon and nitrogen is the most desirable. The range beyond 1/9–9 only results in the same effect as when using a carbide or nitride.

The raw material, in which the above-mentioned component are each classified to not more than 4 μm (not more than 2 μm is more desirable) in mean grain size is desirable to use for a ceramic in the present invention. As a producing method, a mixture of the raw material powder is produced by a hot pressing method, a common sintering method or a hot isostatic pressure sintering method.

For example, the raw material powder mixture is packed into a mold, is cool-compressed at 10 ton/cm$^2$ pressure, and then is formed by lubber pressure and is further formed isostatically at 0.5–10 ton/cm$^2$. It is possible to use either lubber pressure or isostatic pressure, as well as a slip-casting method, for forming. Next, the compact is sintered in a vacuum atmosphere or in a neutral or reducing atmosphere such as argon, hydrogen and carbon dioxide gas at 1300°–2000° C. (1400°–1700° C. is more desirable) for 30–300 minutes. Furthermore, the compact is sintered by a hot isostatic pressure sintering method under a pressure of not more than 2 ton/cm$^2$ by argon gas at 1200°–1700° C. for 5–300 minutes, if necessary. In this process, the common sintering process is omitted by inserting the compact into a metal vessel.

Also, the raw material powder mixture is packed into molds composed of a material such as graphite and is heated and sintered by the hot pressing method in a vacuum or in a neutral or reducing atmosphere such as argon, hydrogen and carbon dioxide gas under a die pressure of 50–300 kg/cm$^2$ at 1300°–2000° C. (1400°–1700° C. is more desirable) for 10–200 minutes.

From the present method, a suitable metal-boride based ceramic sintered body is obtained as a material for various kinds of cutting tools.

The metal-boride based ceramic sintered body in the present invention contains a proper quantity of component (C) such as the various kinds of double carbide or carbo-nitride materials having an oxygen removing effect as already described; component (A such as TiB$_2$ as the main component; and component (B) such as cobalt boride as a binder, so that a fine boride metal powder is hardly oxidized when used as a raw material, has a fine structure, a minimum of pores and high strength, and also has extensive uses as cutting tools and wear-resistant members having high shock resistance.

The present invention is further explained in the following example.

EXAMPLE

Raw material powders were obtained by classifying a finely-ground TiB$_2$, TaB$_2$, CoB (Ti$_8$Hf$_2$)C powder to not more than 4 μm grain size by a classifier. The raw materials were mixed at the ratio of 91 wt. % TiB–6 wt. % TaB–1 wt. % (Ti$_8$Hf$_2$)C. The mixed powder was packed into graphite dies and was sintered under the condition of 200 kg/cm$^2$ pressure in a vacuum at 1500° C. for 60 minutes. The percentage of porosity was 0.06 vol %, the toughness was 4 MPcm$^{\frac{1}{2}}$ and the hardness was 2400 Hv in the obtained sintered body. The results of this example are shown in Table 1, No. 4.

Also, the same experiment was performed using other components. The results are shown in Table 1. However, 1*, 9* and 10* are shown as comparative examples.

TABLE 1

| No. | Specimen Compositions (weight %) | Sintering Condition sintered temperature (°C.) | atmosphere | sintering method | Properties of The Sintered Body toughness K$_1$c (MP cm$^{\frac{1}{2}}$) | porosity (vol %) | hardness Hv (kg/mm$^2$) |
|---|---|---|---|---|---|---|---|
| 1* | 6 TaB$_2$—1 CoB—bal. TiB$_2$ | 1500 | vacuum | H · P | 3.3 | 0.40 | 2300 |
| 2 | 6 TaB$_2$—1 CoB—0.1 (Ti$_8$Hf$_2$)C—bal. TiB$_2$ | 1500 | vacuum | H · P | 3.5 | 0.30 | 2300 |
| 3 | 6 TaB$_2$—1 CoB—1 (Ti$_8$Hf$_2$)C—bal. TiB$_2$ | 1500 | vacuum | H · P | 3.5 | 0.10 | 2350 |
| 4 | 6 TaB$_2$—1 CoB—2 (Ti$_8$Hf$_2$)C—bal. TiB$_2$ | 1500 | vacuum | H · P | 4.0 | 0.06 | 2400 |
| 5 | 6 TaB$_2$—1 CoB—4 (Ti$_8$Hf$_2$)C—bal. TiB$_2$ | 1500 | vacuum | H · P | 4.0 | 0.05 | 2400 |
| 6 | 6 TaB$_2$—1 CoB—6 (Ti$_8$Hf$_2$)C—bal. TiB$_2$ | 1500 | vacuum | H · P | 3.8 | 0.09 | 2400 |
| 7 | 6 TaB$_2$—1 CoB—10 (Ti$_8$Hf$_2$)C—bal. TiB$_2$ | 1500 | vacuum | H · P | 3.7 | 0.30 | 2350 |
| 8 | 6 TaB$_2$—1 CoB—2 (Ti$_5$Hf$_5$)C—bal. TiB$_2$ | 1500 | vacuum | H · P | 3.7 | 0.08 | 2300 |
| 9* | 6 TaB$_2$—1 CoB—2 TiC—bal. TiB$_2$ | 1500 | vacuum | H · P | 3.3 | 0.20 | 2400 |
| 10* | 6 TaB$_2$—1 CoB—2 HfC—bal. TiB$_2$ | 1500 | vacuum | H · P | 3.7 | 0.13 | 2350 |
| 11 | 6 TaB$_2$—1 CoB—2 (Ti$_5$W$_5$)C—bal. TiB$_2$ | 1500 | vacuum | H · P | 3.7 | 0.10 | 2400 |
| 12 | 6 TaB$_2$—1 CoB—2 (Ti$_8$Zr$_2$)C—bal. TiB$_2$ | 1500 | vacuum | H · P- | 3.7 | 0.06 | 2400 |
| 13 | 6 TaB$_2$—1 CoB—2 (Zr$_8$Hf$_2$)C—bal. TiB$_2$ | 1500 | vacuum | H · P | 3.7 | 0.10 | 2400 |
| 14 | 6 TaB$_2$—1 CoB—2Zr(C$_6$N$_4$)—bal. TiB$_2$ | 1500 | vacuum | H · P | 3.7 | 0.10 | 2400 |
| 15 | 6 TaB$_2$—1 CoB—2 (Ti$_8$Hf$_2$)(CN)—bal. TiB$_2$ | 1500 | vacuum | H · P | 3.7 | 0.10 | 2400 |

*comparative example
H · P: hot pressing method

What is claimed is:

1. A high density metal boride-based ceramic sintered body consisting essentially of 0.1 to 10 wt. % of a first component as a metal binder selected from the group consisting of cobalt boride, nickel boride, iron boride and mixtures thereof; 0.1 to 10 wt. % of at least one second component selected from the group consisting of a double carbide of Ti, Zr, Hf or W having an atomic ratio of metals of 1:9 to 9:1 and a double carbo-nitride of Ti, Zr, or Hf having an atomic ratio of metals of 1:19 to 9:1 and an atomic ratio of carbon to nitrogen of 1:9 to 9:1; and a remainder of at least one third component metal boride selected from the group consisting of TiB$_2$, ZrB$_2$, CrB$_2$, HfB$_2$, VB$_2$, TaB$_2$, NbB$_2$, MnB$_2$, MoB$_2$, YB$_2$, CrB, VB, TaB, NbB, MoB, HfB, YB, ZrB, TiB, MnB, W$_2$B$_5$ and MO$_2$B$_5$.

2. A high density metal boride-based ceramic sintered body according to claim 1, wherein said first, second and third components each have a mean grain size of 4 μm or less.

3. A high density metal boride-based ceramic sintered body according to claim 2, wherein said first, second and third components each have a mean grain size of 2 μm or less.

4. A high density metal boride-based ceramic sintered body according to claim 1, wherein said metal binder is CoB and said metal boride is TaB$_2$ and TiB$_2$.

5. A high density metal boride-based ceramic sintered body consisting essentially of 0.1 to 10 wt. % of a first component as a metal binder selected from the group consisting of cobalt boride, nickel boride, iron boride and mixtures thereof; 0.1 to 10 wt. % of at least one second component selected from the group consisting of a double carbide of Ti, Zr, Hf or W having an atomic ratio of metals of 1:9 to 9:1; and a remainder of at least one third component metal boride selected from the group consisting of $TiB_2$, $ZrB_2$, $CrB_2$, $HfB_2$, $VB_2$, $TaB_2$, $NbB_2$, $MnB_2$, $MoB_2$, $YB_2$, $AlB_2$, $MgB_2$, CrB, VB, TaB, NbB, MoB, HfB, YB, ZrB, TiB, MnB, $W_2B_5$ and $Mo_2B_5$.

6. A high density metal boride-based ceramic sintered body according to claim 5, wherein said first, second and third components each have a mean grain size of 4 $\mu$m or less.

7. A high density metal boride-based ceramic sintered body according to claim 6, wherein said first, second and third components each have a mean grain size of 2 $\mu$m or less.

8. A high density metal boride-based ceramic sintered body according to claim 5, wherein said metal binder is CoB and said metal boride is $TaB_2$ and $TiB_2$.

* * * * *